April 9, 1946.     A. SILVERMASTER     2,398,121
SINE BAR
Filed Oct. 4, 1943

ARKADY SILVERMASTER,
INVENTOR.

BY Philip Subkow
ATTORNEY.

Patented Apr. 9, 1946

2,398,121

UNITED STATES PATENT OFFICE 2,398,121

SINE BAR

Arkady Silvermaster, Los Angeles, Calif.

Application October 4, 1943, Serial No. 504,965

3 Claims. (Cl. 33—174)

The sine bar of my invention is a useful machine shop tool for measuring angles or locating work to a given angle or for setting a cutting tool to take a cut at a given angle to a given fiducial line or fiducial surface.

While milling machines and lathes, in which angles must be set, usually provide divided circles for setting the angle of the cutter to the work, for instance, the dividing head of a milling machine or the compound rest or the taper attachments of a lathe, these divided circles or graduated arcs may not be relied upon for accurate settings, and particularly may not be relied upon for fine settings. For such purpose it is desirable to rely upon the trigonometric functions of the angles rather than to measure or set the angles. It has therefore long been machine-shop practice to use the sine bar method in some form.

One of the limitations of the sine bars of the prior art, so far as are known to me, is that they are used in conjunction with a fiducial plane. The angle to be established or measured is determined by measuring, from this fiducial surface, vertical distances to two separated reference points on the sine bar whose separation on the sine bar is known. The sine of the desired angle is the difference between these vertical distances divided by the separation.

It is an object of my invention to design a sine bar which may be used in conjunction with a fiducial line and which will not require the use or establishment of a fiducial plane or of a plane including the fiducial line.

Such sine bars are of value when it is necessary to measure or establish an angle with a fiducial line, for instance, the axis of a cylinder, the spindle of a tool or machine tool element, or the line of cut to be taken by a cutting tool. For example, it is useful in establishing the line of travel of a cutting tool which is to cut a taper of desired angularity in a lathe, employing either the compound rest alone or for setting the taper attachment in a lathe or in cutting a conical surface in a boring mill.

My sine bar is as well applicable to use with a fiducial surface. It therefore may be termed a "universal" sine bar. It may therefore be used in setting fluting cutters in a milling machine by establishing the angle of the cutter teeth to the axis of the tail centers of the milling machine. It may be used in setting angles for the dividing head for milling angular cutters, end-mills, and taper reamers. It may be used in setting the spindle of index cutters having universal centers. It may be used in setting the universal milling attachment. It may be used in setting the angular relation of the axis of a grinding wheel to the work to obtain the necessary angle.

It is useful in setting the angle of the axis of the tail pieces of the dividing head to the axis of the cutter of a cutting tool, for cutting spirals on a milling machine.

These applications illustrate the wide applicability of my universal type of sine bar.

It is therefore an object of my invention to devise a type of sine bar adapted to establish or measure an angle in reference to a fiducial line or to a fiducial plane.

It is a further object of my invention to devise a sine bar which may be used to establish or measure the angle of travel of a cutting element with reference to a fiducial line bearing an angular relationship to the direction of cut to be taken by said cutting tool.

The sine bar of my invention consists of two hinged arms, one of said arms establishing a fiducial plane, means for mounting said bar to establish a fiducial line parallel to said fiducial plane and perpendicular to the axis of the hinge.

The sine bar may be so mounted in the machine tool that either the fiducial plane or the fiducial line will have a known or determinable angle to any other plane, for instance, the face plate or the dividing head plate or to any other fiducial line, for instance, the axis of a spindle or the axis of centers.

This invention will be further described in connection with the drawing, in which Fig. 1 is a side view of the sine bar embodying my invention;

Figure 3:
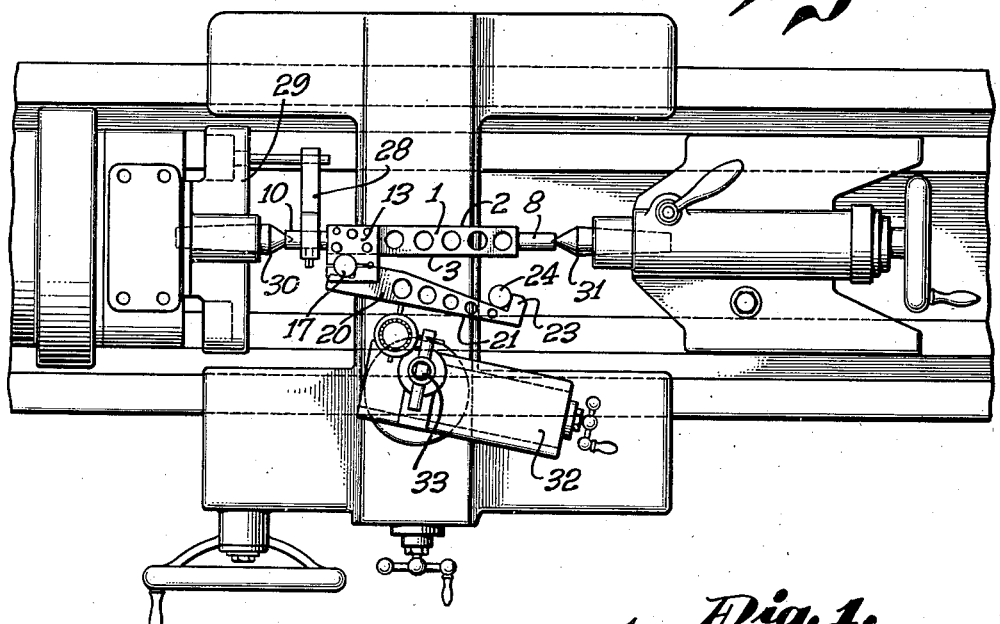
Fig. 3 shows one application of my invention to a lathe.

The sine bar as illustrated in these figures is composed of an arm 1 having an exterior base 2 and an interior top 3 parallel to base 2, and also having sides 4 and 5. Set in the end 7 is a journal 8 carrying a center mark 9. End 6 carries a journal 10 having a center mark 11. The marks are in the axes of the journals 10 and 8. The axes of the journals are parallel to base 2 and top 3 and also perpendicular to the axis of hinge pin 17. The arm 1 carries a number of clamping holes 12 spaced along the bar and extending from the side 4 to the side 5. Mounted on each side of the arm 1 are plates 13 and 14. These plates are mounted by means of screws 15. The plates are split at 16 and carry the cylindrical hinge pin 17.

Clamping holes may be provided in arm 20 similar to clamping holes 12 in arm 1.

The sine bar may be mounted on any surface by means of clamps inserted in either holes 12 or 27. For example, arm 1 may be mounted on the plate of a dividing head of a vertical milling machine. The screw 18 is loosened and arm 20 is moved until the height 25-26 is equal to the sine of the desired angle times the sine bar constant.

A dial indicator is mounted on the spindle of the milling machine. The dividing head is adjusted so that as the base is raised or lowered the indicator will show that the surface 22 is parallel to the axis of the spindle, or perpendicular to the base. The plate of the dividing head will then have the above angular relation to the axis of the spindle and be set in relation to the base at 90° minus this angle. The same adjustment may be made by clamping arm 21 to the base and making base 2 parallel to the axis of the spindle.

The use of the sine bar may be employed in a lathe for setting a cutting tool so that it will travel in a line bearing a desired angular relation to the center line of the lathe centers, as illustrated in Fig. 3.

Figure 1:
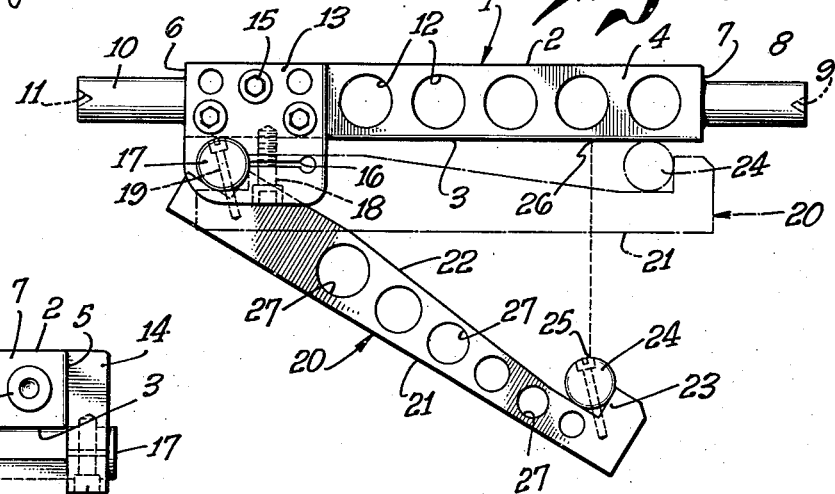
Figure 2:
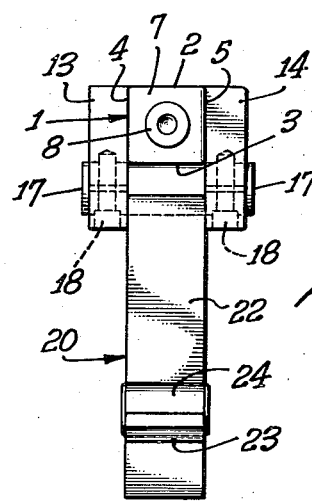
Fig. 2 is a right-hand end view.

The sine bar is mounted by means of a dog 28 mounted in face plate 29 of the lathe. The centers 30 and 31 are inserted into the recesses 9 and 11. The sine bar is then adjusted by loosening screw 18 and the arm 21 is moved until the desired length 25—26 is obtained. As previously, this should be equal to the sine bar constant multiplied by the sine of the angle that the travel of the cutting tool, in this case mounted in the compound rest 32, makes with respect to the axis of the lathe centers. The screw 18 is tightened. A dail indicator is mounted on the tool post 33 of the compound rest, as indicated in Fig. 3. This pin is tangent, within machining limits, to base 3. The hinge pin is clamped in the split plates 13 and 14 by means of the screw 18. Mounted on the hinge pin 17 by means of screw 19 is arm 20. The arm 20 has a plane exterior top 21 and a relieved interior bottom 22 ending in a square end 23. Set in the end of the relieved bottom 22 and next to the end 23 is a cylinder 24 held by a suitable screw. The diameters of the cylinders 17 and 24 are equal and the distance from the top 21 of the arm 20 to the end of the diameter of 24 perpendicular to the top 21 is equal to the distance between the top 21 and the end of the diameter of 17 perpendicular to 21. The result of this design is that when the arm 20 is moved to the extreme of its approach to 1, by loosening 18, shown in dotted lines on Fig. 1, the cylinder 24 is tangent within machining limits to the top 3 of arm 1 and the top 21 is parallel to top 3 and base 2 of arm 1.

The distance between the axis of cylinder 24 and cylinder 17 may be termed the constant of the sine bar. It is usefully 5" to 10" or some multiple of 10".

For any position of arm 20, the sine of the angles made by 21 or any line or plane surface tangent to cylinders 24 and 17 or by the line connecting the centers of cylinders 17 and 24 with the surface 3 or 2, or with the axes of journals 8 or 10, is given by multiplying the constant by the height of the right triangle of the sine bar. This height is measured by the length of the line 25—26, the prolongation of the diameter of 24, perpendicular to the top 3 of arm 1 and intercepting the surface of the cylinder 24 at 25. This height may be measured by a vernier height gage or by means of Johansson blocks.

The compound rest is adjusted until the cross slide of the compound rest will move the indicator across the face 21 without deviation. This will indicate that the direction of motion of the tool post 33 is parallel to the face 21 and therefore at the desired angle to the axis of the lathe centers.

Further applications of my universal sine bar will be apparent from my description to those skilled in the art. This description is not to be taken as limiting the scope of the invention, and it should be understood that various modifications and adaptations thereof may be made within the spirit of the invention as set forth in the appended claims.

I claim:

1. A sine bar, comprising an arm having an exterior plane surface, a second arm hingedly mounted with said first arm, journals mounted on said first-named arm, the axes of said journals being parallel to the said exterior surface of said first-named arm, and center marks at the ends of said journals located at the axes of said journals, whereby a line connecting said centers is parallel to said exterior surface.

2. A sine bar, comprising an arm having a plane exterior surface, a hinge plate on said arm, a cylindrical hinge pin on said hinge tangent to the interior surface of said arm, journals at the ends of said arm, the axes of said journals being in line and perpendicular to the axis of said hinge, a second arm, one end of said second arm being mounted on said hinge pin, the other end being free, and a stop cylinder mounted at the free end of said second arm, said second cylinder being tangent to the interior surface of said first arm at the point of closest approach of said arms, the exterior surface of said second arm being also plane, the distance from the exterior surface of said second arm to the circumference of said hinge cylinder, measured along the diameter of said hinge cylinder perpendicular to said exterior surface of said second arm, being equal to the distance from the said exterior surface of said second arm to the circumference of said stop cylinder measured along a diameter perpendicular to the said last-named surface.

3. A sine bar comprising two arms having exterior plane surfaces, a hinge for said arms, one of said arms having a journal at each end of said arm, means for mounting said bar upon a plane surface on the exterior surfaces of one of said arms, and means for mounting said bar upon a plane surface upon the exterior surface of the other of said bars.

ARKADY SILVERMASTER.